United States Patent [19]

Glover

[11] 4,046,700

[45] Sept. 6, 1977

[54] SLUDGE SCRAPER MECHANISM

[75] Inventor: Nolan S. Glover, Mineral Wells, Tex.

[73] Assignee: Harsco Corporation, Camp Hill, Pa.

[21] Appl. No.: 594,116

[22] Filed: July 8, 1975

[51] Int. Cl.² .................................................. B01D 21/18
[52] U.S. Cl. ..................................... 210/523; 210/532 R
[58] Field of Search ............... 210/523, 525, 527–531, 210/83, 513, 532 R, 532 S

[56] References Cited

U.S. PATENT DOCUMENTS

| | | | |
|---|---|---|---|
| 1,911,008 | 5/1933 | Withington | 210/525 |
| 2,138,678 | 11/1938 | Pearl | 210/528 |
| 2,779,471 | 1/1957 | Knapp | 210/527 X |
| 2,897,149 | 7/1959 | Griffith | 210/523 X |
| 3,498,467 | 3/1970 | Hollebrandt | 210/527 |

FOREIGN PATENT DOCUMENTS

| | | | |
|---|---|---|---|
| 619,345 | 3/1949 | United Kingdom | 210/527 |
| 537,309 | 6/1941 | United Kingdom | 210/527 |
| 583,273 | 12/1946 | United Kingdom | 210/527 |

*Primary Examiner*—Frank W. Lutter
*Assistant Examiner*—William A. Cuchlinski, Jr.
*Attorney, Agent, or Firm*—Cameron, Kerkam, Sutton, Stowell & Stowell

[57] ABSTRACT

An improved scraper to scrape the sludge from the bottom of a clarifying tank in a biological waste treatment plant. The scraper is Y-shaped, having two angularly spaced blades which move under the sludge at such an angle as to lift the sludge onto the blade such that the sludge urges the scraper in wiping relation with the bottom of the tank. The scraper is suspended by flexible cables from support arms which extend outwardly from an oscillating bridge moveable over the top of the clarifier tank. The arms are arranged to extend over transverse partitions in the clarifier tank drawing the flexible cables over support rollers as the bridge approaches the partition to lift the scraper upwardly as the scraper approaches the partition to prevent sludge from being trapped against the partition.

19 Claims, 10 Drawing Figures

SLUDGE SCRAPER MECHANISM

BACKGROUND

Biological waste treatment is a process which uses microorganisms to consume dissolved organic contaminants in waste water and convert them to additional microorganisms. In aerobic systems, microorganisms are mixed with waste water containing organics and aerated with oxygen for a predetermined period of time. After aeration, the mixture of microorganisms and water is transferred to a settling zone or clarifier tank where the solid organic contaminants and microorganisms settle, allowing the water at the upper portion of the clarifier tank to be removed while leaving organics in the clarifier.

The settled organic matter lies on the bottom of the tank and must be removed periodically to prevent excessive buildup of microorganisms and sludge at the bottom of the tank. The removal is usually accomplished by scraping it off the bottom of the tank.

Control of the sludge at the bottom of the tank is very critical in adjustment of the sewage treatment plant. In order to maintain the proper amount of microorganisms in the aeration tank, the proper amount of sludge must be returned to the aeration zone from the clarifier zone, thus maintaining the microorganisms at the proper level.

Aerobic waste treatment for organic carbon removal utilizes biological actions similar to those found in natural waterways. Treatment plants are designed to speed up natural water purification processes and provides means for treating and disposing of waste products from water. "Sludge" is made up of mixed culture of bacteria called Zoogloea ramigera. Other microorganisms such as paramecia are also present and are referred to as free swimmers. All these organisms remove some inorganics, by using the materials for food and as essential nutrients.

Microorganisms remove waste water contaminants by absorption and adsorption. Adsorption involves adhering contaminants to the surface of the cells. Material entrapped in this manner is carried by the cell until it is completely digested or disposed of as waste sludge. Absorption involves taking contaminants into the cell. Materials absorbed are completely digested by the microorganisms. In both cases the end products of the process are $CO_2$ and $H_2O$. Sludge containing substances are not readily degradable can eventually metabolize these substances in the digester or holding tank. Digested sludge is relatively inert and can be readily dewatered for landfill.

Sludge settling and compaction characteristics are a primary requisite to successful operation of an activated sludge process. With poor settling sludge, solids carried over the effluent will not only increase TSS (Total Suspended Solids) but also increase BOD (Biological Oxygen Demand) which results in loss of process performance. Poor compaction results in a low return sludge concentration and will limit the MLSS (Mixed Liquor Suspended Solids) concentration in the aeration zones.

Metabolism and energy levels of the biology play an important role in whether or not the cells will coagulate and form large floc particles for good settling characteristics. Performance is based on having enough biological sludge to readily consume the organic pollutants present in the waste water. If biological sludge is in excess, some of it will die and the residue will be discharged in the effluent as part of the TSS.

Failure to remove the sludge periodically will result in an anaerobic condition which will sap the oxygen from the effulent and result in a low DO (Dissolved Oxygen) contact and have adverse results in the receiving stream of water. The anaerobic sludge will eventually float to the top of the settling tank and be carried over into the effluent stream itself. In addition, the contaminated sludge will result in equipment breakdown in the sewage treatment plant.

Heretofore, scrapers which were rigid enough to scrape the sludge from the bottom of the tank without passing or sliding over the sludge required heavy rigid structures to support the scraper blade. This structure must necessarily be submerged in the liquid of the clarifier tank. Two problems are developed from using this type of structure: (1) the structure is subject to the highly corrosive liquid of the clarifier tank and is usually oxidized by passage through the clarifier, thus weakening the structure until it collapses (2) the structure creates eddy currents within the liquid itself by liquid passing therethrough, which tend to keep the organic material and settled sludge suspended in the liquid, which defeats the purpose of the clarifier tank.

My invention is directed at providing a more efficient scraper to remove the sludge.

SUMMARY

An improved scraper blade mechanism for scraping settled sludge from the bottom of a settling tank having two non-intersecting parallel or concentric walls with first and second partitions transversely disposed between the walls. A bridge is supported over the walls of the tank and moveable between the first and second partitions by drive means such as a motor. Support arms extend from the moveable bridge such that when the bridge is adjacent either one of the partitions, the support arms extend over the partition.

A scraper is provided with angularly spaced blades formed such that the sludge is moved onto the surface of the blade and urges the blades into wiping engagement with the bottom of the tank to prevent the blade from wiping over the sludge. The scraper has a suspension flange thereon to which the ends of a plurality of suspension cables are secured, the other ends of the cables being secured to the support arms which extend outwardly from the bridge. The cables are drawn by movement of the bridge such that they pull the scraper along the bottom of the tank.

The cables are drawn over guide rollers attached on the upper end of the partitions and adapted to guide the cables over the partitions. As the support arms are extended over the partition, the cables lift the scraper off the bottom of the tank, raising the scraper up the partition wall to prevent trapping the sludge against the partition and eliminating stagnation of the sludge in the area adjacent the partition. As the bridge reverses direction the cables are extended to lower the scraper back to the bottom of the tank and draws the scraper toward the opposite partition where, upon the suspension cables engaging the rollers on the partition, the scraper is lifted off of the tank bottom for the purpose hereinbefore mentioned.

The primary object of the invention is to provide a single scraper moveable between two partitions engaging two spaced partitions such that the blade is raised off of the floor adjacent the partitions to eliminate stagnation of the areas adjacent the partitions which would permit the sludge to become anaerobic.

Another object of the invention is to provide a scraper blade with angularly spaced arms to scrape under the sludge such that the sludge is lifted onto the blade to urge the blade into wiping engagement with the bottom of the tank to remove the sludge instead of allowing the blade to wipe over the sludge.

Another object of the invention is to minimize maintenance inasmuch as worn parts can be replaced from the exterior of the tank, thereby eliminating the necessity of draining the clarifier tank.

A further object of the invention is to eliminate parts that are subject to corrosive action because they are positioned above the tank and therefore removed from the corrosive environment in the liquid of the clarifier tank.

Another object of the invention is to provide a scraper blade and support system completely compatible with existing clarifier tanks.

A still further object of the invention is to provide a structure which can effectively remove the sludge from the bottom of the clarifier tank yet has a minimum of structure within the liquid of the tank, thereby minimizing the amount of sludge which is stirred back into suspension by the movement of the scraper blade through the liquid.

Other and further objects of the invention will become apparent upon referring to the detailed description hereinafter following and to the drawings annexed hereto.

DESCRIPTION OF THE DRAWINGS

Drawings of a preferred embodiment of the invention are annexed hereto so that the invention may be better and more fully understood, in which:

FIG. 8 is an enlarged bottom perspective view of the scraper blade;

FIG. 10 is an enlarged partial view of the drive means. Numeral references are employed to designate parts of the drawings and like numerals are employed to designate like parts throughout the various figures of the drawing.

DESCRIPTION OF A PREFERRED EMBODIMENT

Figure 1:
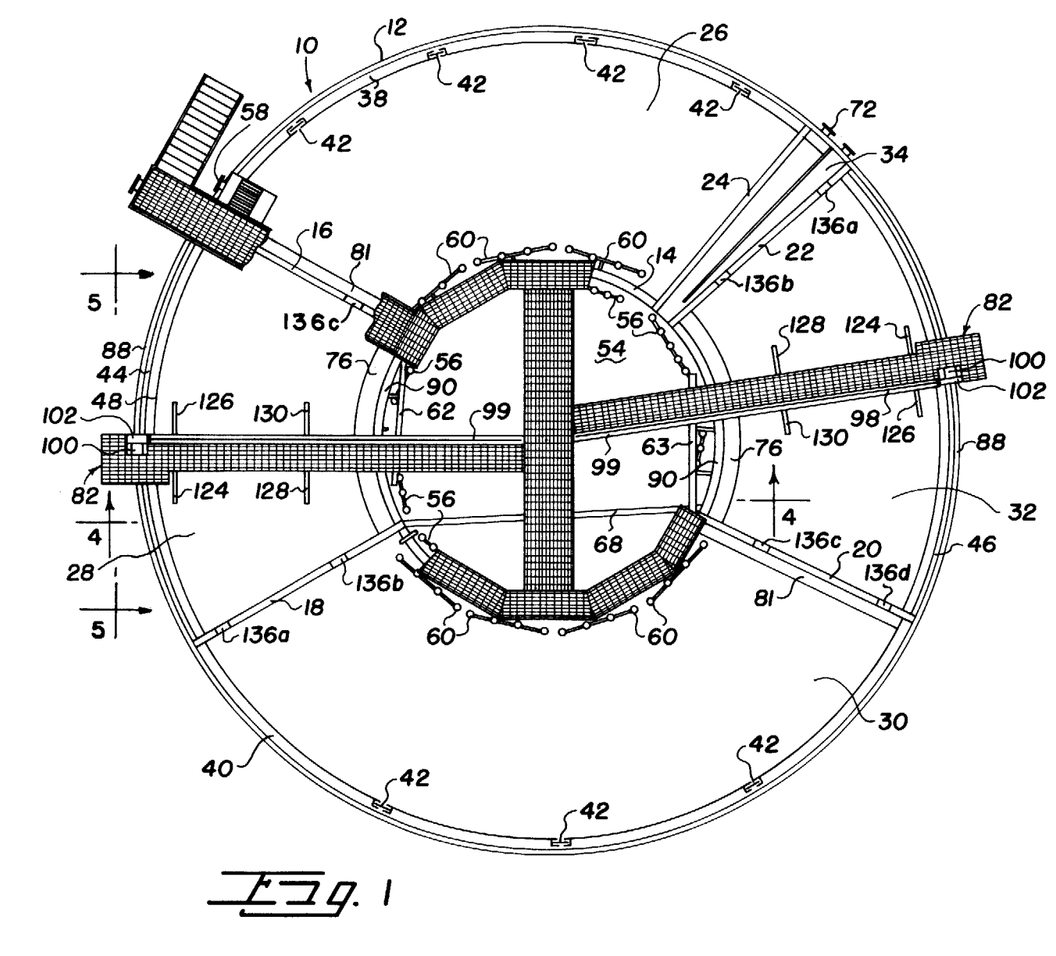
FIG. 1 is a plan view of a biological waste treatment plant incorporating my improvement.

FIG. 1 illustrates a typical biological waste treatment plant comprising a tank 10 having a first wall 12 and a second wall 14. Partitions 16, 18, 20, 22 and 24 divide the tank into treatment zones comprising a first aeration zone 26, a first clarifier zone 28, a second aeration zone 30, a second clarifier zone 32, and a chlorine contact zone 34. The lower ends 16a, 18a, 20a, 22a, 24a of partitions 16–24 are rigidly secured to bottom 36 to form a water tight tank.

Figure 3:
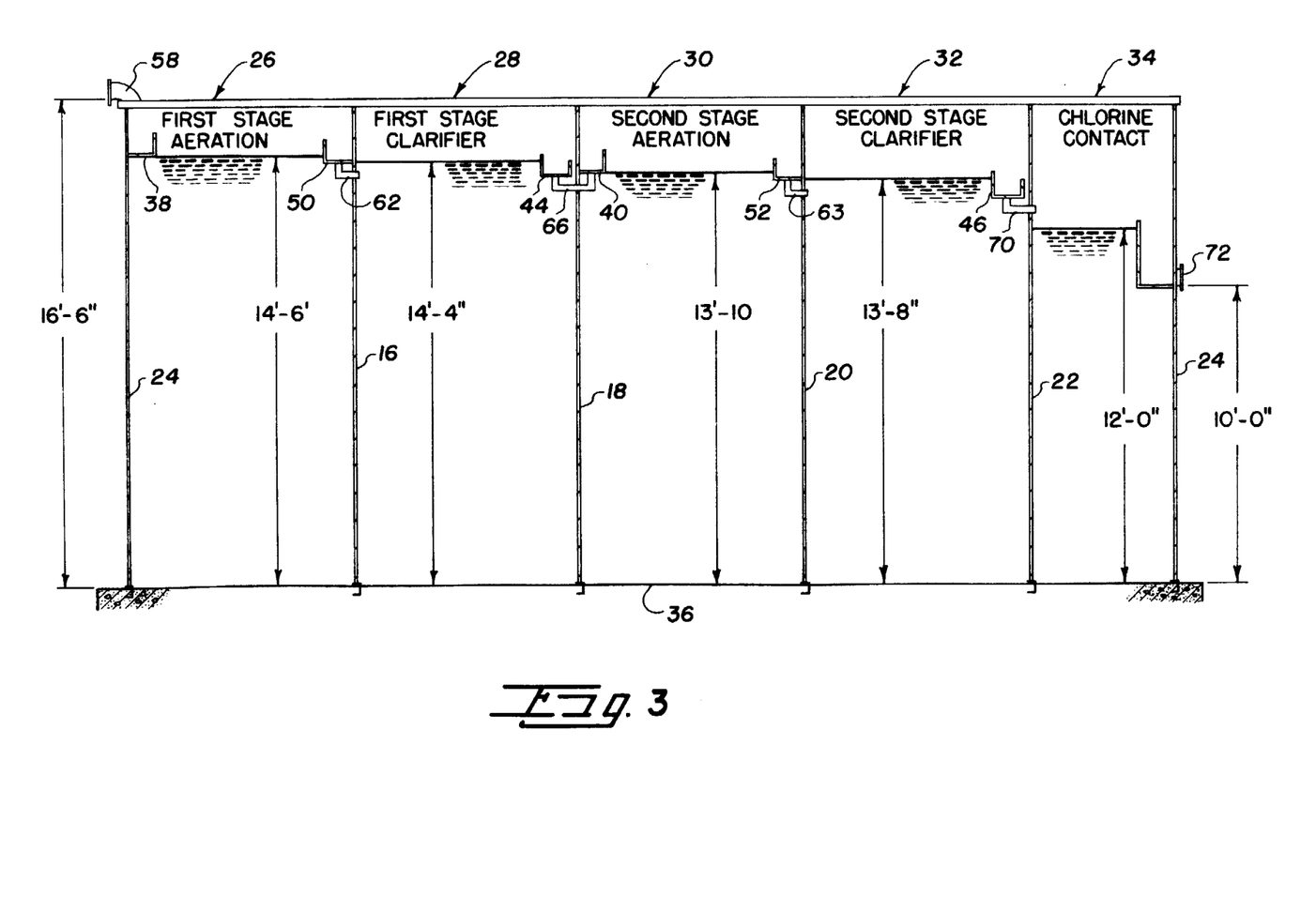
FIG. 3 is a diagrammatic view of the hydraulic profile of a waste treatment plant showing the gravity flow therethrough.

Distributions troughs 38 and 40 are rigidly secured to the upper end 12b of wall 12 in the first and second aeration zones 26 and 30 (FIGS. 1 and 3). Distribution troughs 38 and 40 have adjustable slide gates 42 to permit even distribution of the influent into the first and second aeration zones 26 and 30.

Effluent troughs 44 and 46 (FIGS. 1 and 3) are rigidly secured to the upper end 12b of wall 12 in the first and second clarifiers 28 and 32. As more clearly illustrated in FIG. 4, effluent troughs 44 and 46 have an adjustable weir 48 to control the input of clarified liquid into the effluent troughs 44 and 46.

Collection troughs 50 and 52 (FIGS. 1 and 3) are secured to the upper end 14b of wall 14 in the first and second aeration zones 26 and 30 to collect effluent for distribution into the first and second clarifiers 28 and 32, respectively.

Biological waste treatment is a process by which microorganisms consume dissolved organic contaminants in the waste water and converts them to additional microorganisms. Oxygen is supplied to the microorganisms in the first and second aeration zones 26 and 30 by means of diffusers 60 which meter the oxygen through the liquor. The effluent flows through conduits 62 and 63 to clarifiers 28 and 32 to allow the solid organic contaminants and microorganisms to settle out. Upon settling of the microorganisms and other materials onto the bottom 36a of the clarifiers 28 and 32, the microorganisms and organic material are referred to as sludge. Periodic removal of the sludge by scraper means 103 and skimmer means 80 (FIG. 4) is desirable in order to return a portion of the sludge to the first and second aeration zones 26 and 30 to maintain the proper biological life forms in the aeration zones. Part of the sludge must be removed to the aerobic digester 54 located in the center of circular wall 14 in the preferred embodiment. Sludge may be discharged by other means or hauled away from the treatment plant.

The aerobic digester 54 is a holding tank positioned in between circular wall 14 in the preferred embodiment for further decomposition of the sludge. Diffusers 56 distribute oxygen through the sludge, supplying the BOD of the sludge to further oxidize the sludge to permit an aerobic bacteria to decompose the sludge.

The sludge settles on the bottom 36a of the first and second clarifiers 28 and 32, forming a thick layer of mud-like substance. The sludge must be removed in order to prevent the bacteria from dying and becoming an anaerobic.

Figure 4:
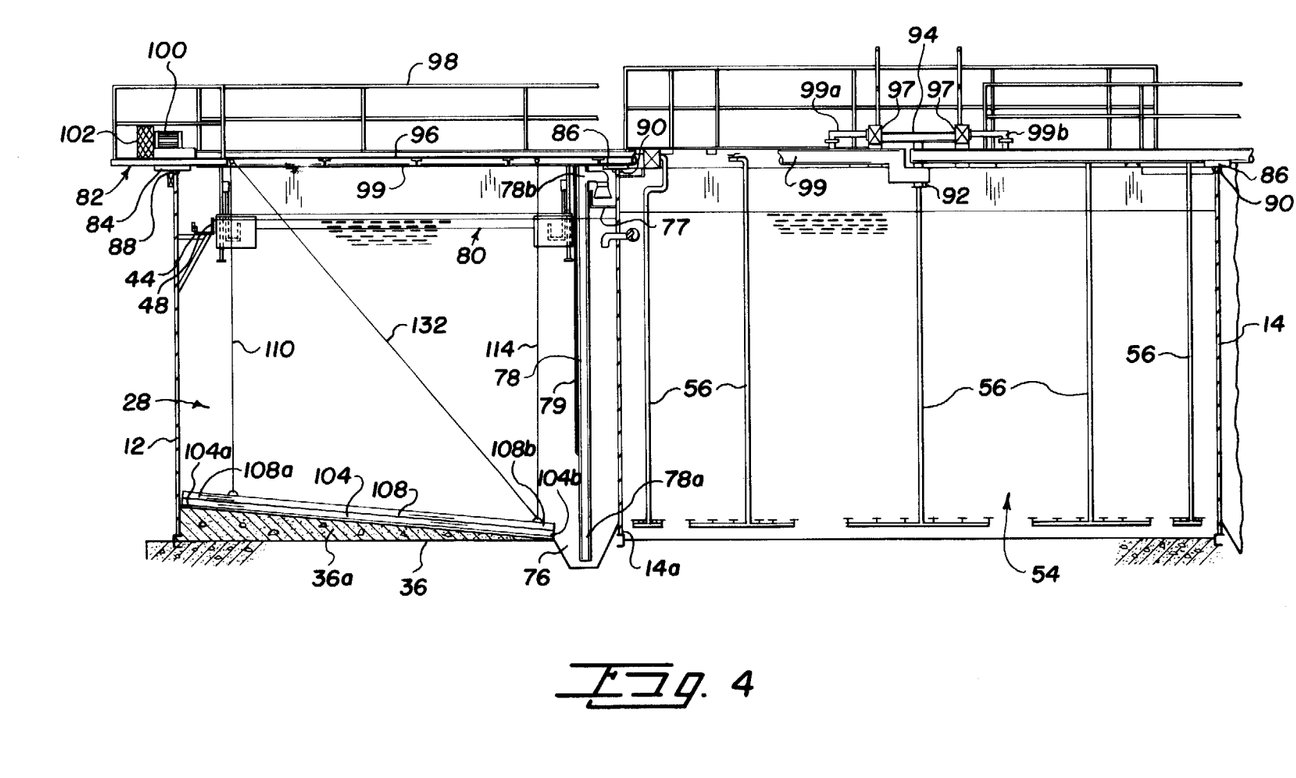
FIG. 4 is a cross-sectional elevational view taken along line 4—4 of FIG. 1.

Scraper means is provided to move the sludge into sludge trough 76, as best illustrated in FIG. 4 of the drawing. As illustrated in the preferred embodiment, sludge trough 76 is positioned adjacent the lower end 14a of wall 14. Air-lift pump 78 removes the sludge from trough 76 and deposits it outside the clarifier as more fully explained hereinafter. Bottom 36a is inclined downwardly from wall 12 to the sludge trough 76 in the clarifiers 28 and 30 to aid in moving the sluge toward sludge trough 76.

In typical treatment plants portions of the sludge will sometimes float to the top of the clarifiers 28 and 32 and must be removed by a skimmer means 80 to prevent a crust from forming which would be a nesting place for flies and bacteria.

Figures 8, 10:
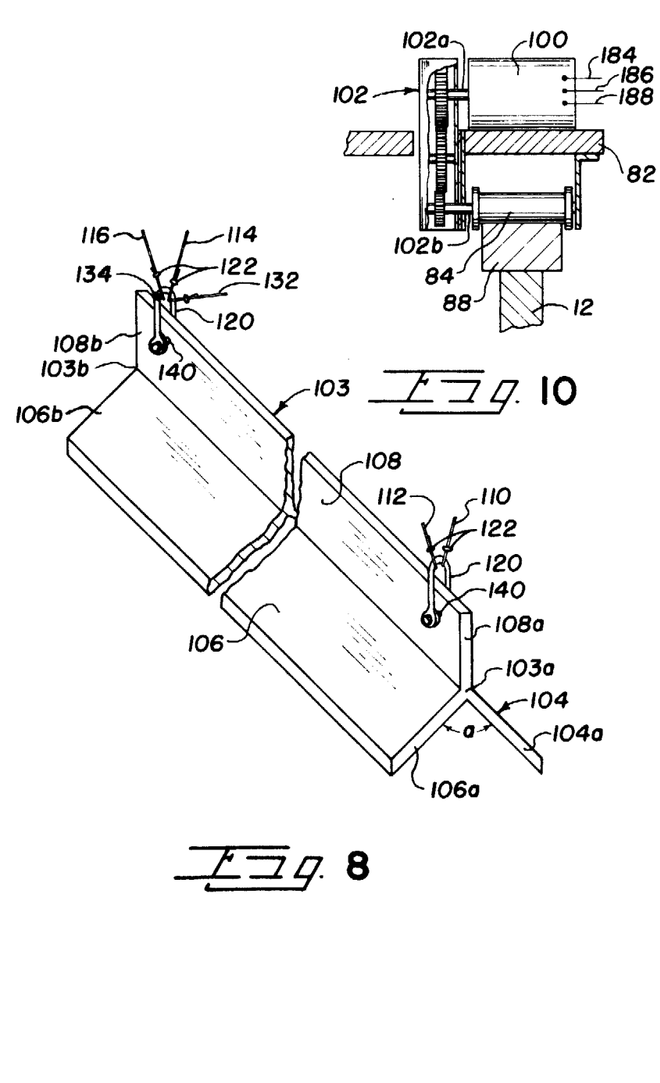

Scraper means comprises a scraper 103 having spaced blades 104 and 106 angularly disposed from flange 108 as best illustrated in FIG. 8 of the drawing.

Blades 104 and 106 have ends 104a and 106a adjacent the outside wall 12 of tank 10 and ends 104b and 106b adjacent the sludge trough 76.

Means to support the scraper 103 and skimmer means 80 comprises oscillating bridges 82 moveably disposed over walls 12 and 14. Wheels 84 and 86 (FIGS. 4 and 9) are rotatably secured to bridge 82 by means such as an axle 102b and rotate on tracks 88 and 90 which are rigidly secured to the upper portions 12b and 14b of walls 12 and 14. As illustrated in the preferred embodiment platform 94 is positioned over the aerobic digester 54 across the diameter of same and rigidly secured to wall 14. Bridges 82 are pivotally secured to platform 94 by pivot pin 92 which is rigidly secured to the center of the platform 94 substantially over the center of the aerobic digester 54 in the preferred embodiment.

It should be readily apparent that a tank of a different geometric configuration, such as rectangular may not require structure to support a pivot point.

As illustrated in the preferred embodiment the bridges 82 having gratings 96 to form a floor and hand rails 98 provided for convenience of maintenance. An air supply conduit 99 (FIG. 5) is rigidly secured to the side of bridges 82 to provide structural support and air to the skimmer means 80. As best illustrated in FIG. 4, air supply conduits 99 are connected to air plenums 97 by flexible conduits 99a and 99b. The air plenums 97 communicate with large blowers (not shown).

Figure 5:
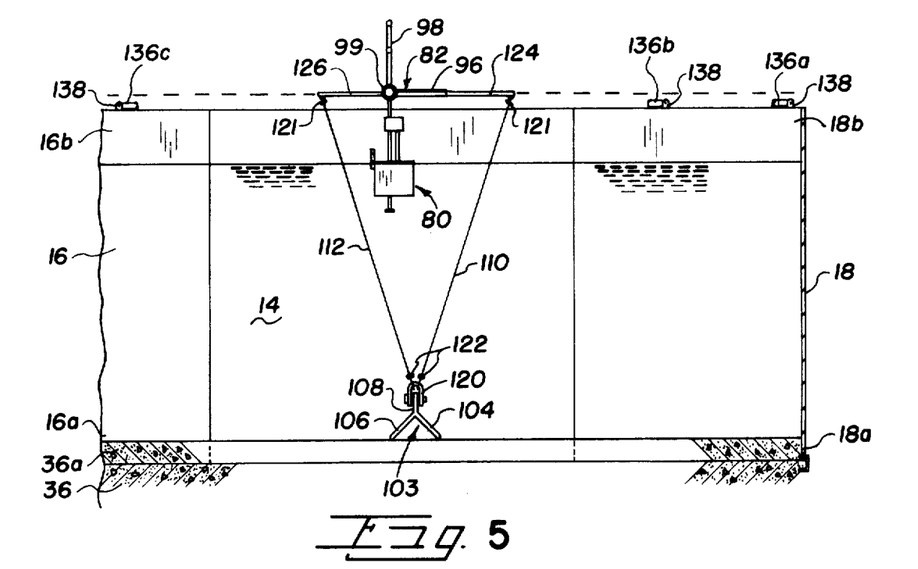
FIG. 5 is a cross-sectional elevational view taken along line 5—5 of FIG. 1.

As both clarifiers 28 and 32 are substantially identical in structure, only clarifier 28 illustrated in FIGS. 4 and 5 is described in detail. Drive means such as motor 100 (FIG. 9) is secured to the input shaft 102a of transmission 102. The output shaft 102b of transmission 102 is rigidly secured to wheel 84 which turns on track 88 to move the oscillating bridge 82 from a first position adjacent partition 16 to a second position adjacent partition 18 over the first clarifier 28.

Flexible suspension means such as cables 110, 112, 114, 116, 132 and 134 are secured to the scraper 103 and support arms 124, 126, 128 and 130. Cables 110 and 112 are secured to end 108a of flange 108 by means such as shackle 120 which is rigidly secured to the flange 108 through aperture 140. Cable clamps 122 secure the cables 110 and 112 to the shackle 120. The other end of cables 110 and 112 are secured to support arms 124 and 126 by means such as cable clamps 121. Support arms 124-130 extend outwardly from bridge 82 perpendicular to the longitudinal axis of bridge 82 and in a plane parallel to the surface of the bridge.

End 108b of flange 108 has one end of cables 114 and 116 looped through shackle 120 which are rigidly secured thereto by cable clamps 122 with the other end of cables 114 and 116 rigidly secured to support arms 128 and 130. Scraper 103 is suspended from oscillating bridge 82 by the cables 110-116 and is substantially aligned with a plane formed through the longitudinal axis of bridge 82 and perpendicular to the bottom 36 of tank 10.

Cables 132 and 134 have one end rigidly secured to support arms 124 and 126 and the opposite end rigidly secured to end 108b of flange 108 through shackles 120 to prevent movement of the scraper 103 downwardly on the sloped bottom 36a into sludge trough 76.

It should be readily apparent that cables 110-116, 132, and 134 may be coated with substances such as plastic, polyurethane, and the like to protect the cables from corrosion.

Arms 124-130 extend above ends 16b and 18b of partitions 16 and 18 such that as bridge 82 is moved adjacent wall 16 the support arms 126 and 130 extend over partitions 16, allowing the edge of blade 106 to contact the lower edge 16a of partition 16. Likewise arms 124 and 128 extend over the upper end 18b of partition 18 when bridge 82 is moved adjacent partition 18 such that the edge of blade 104 contacts the lower end 18a of partition 18.

Figure 6:
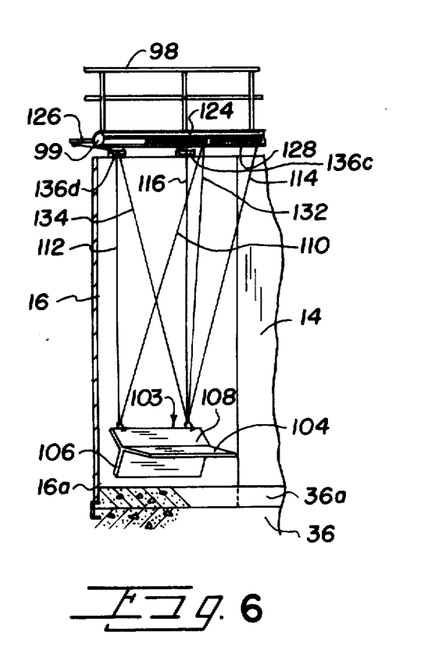
FIG. 6 is a cross-sectional view similar to FIG. 5 showing the scraper blade in lifted position at one end of the tank compartment.
Figure 7:
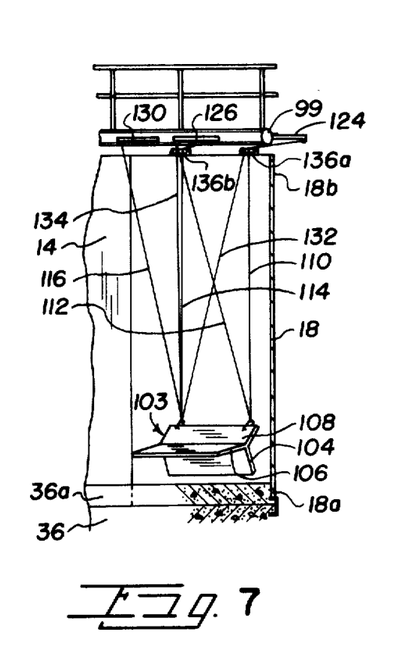
FIG. 7 is a cross-sectional view similar to FIG. 6 showing the scraper blade in lifted position at the opposite end of the tank compartment.

As illustrated in FIG. 6, cables 110 and 114 are drawn over the upper end 18b of partition 18 as bridge 82 moves adjacent partition 18, elevating scraper 103. Likewise scraper 103 is elevated as cables 112 and 116 are drawn over the upper ends 16b of partition 16 (FIG. 7). Guide means such as rollers 136a, 136b, 136c and 136d rotatively secured to brackets 138 on the upper ends 16b and 18b to partitions 16 and 18 and are adapted to guide cables 110-116 over the upper ends of the partitions 16 and 18 to reduce the friction of the cable moving over partitions 16 and 18.

Scraper 103 is lowered from a raised position, adjacent partition 16 to bottom 36a, as oscillating bridge 82 moves in a direction toward partition 18, thus allowing the edge of blade 106 to contact the lower edge 16a of partition 16 and the edge of blade 104 to contact the bottom 36a of the clarifier tank 28. As bridge 82 moves toward partition 18, the edge of blade 104 is urged into contact with floor 36a by the sludge. Blades 104 and 106 are angularly disposed so as to slide under the sludge, lifting the sludge onto the upper surface of blades 104 and 106. The sludge exerts a downward pressure on the surface of blade 104 as scraper 103 moves toward partition 18 urging the blade 104 into wiping relation with the bottom 36a. Since bottom 36a is sloped the sludge moves toward the sludge trough 76 as the scraper 103 travels across the clarifier tank 28.

It should be readily apparent that by adjustment of the length of the cables 110-116, the angular relation of scraper blade 103 relative to a plane through the longitudinal axis of bridge 82 and perpendicular to floor 36, may be changed to meet the desired needs of the clarifier tank. The lengths of the individual cables 1110-116 may be adjusted to change the alignment of the scraper 103 from the position radially aligned with the longitudinal axis of bridge 82 to an angular position in relation to the longitudinal axis of bridge 82.

The length of arms 124-130 determines the position at which cables 110-116 initiate the lifting of scraper 103.

As illustrated in FIG. 4, cables 114 and 116 are initially longer than cables 110-112 as the distance from the bridge 82 to bottom 36a is greater adjacent wall 14 than wall 12 due to the incline on bottom 36a. Therefore, as illustrated in the preferred embodiment, it is desirable that arms 128 and 130 initiate contact with rollers 136b and 136c, respectively, prior to arms 124 and 126 in order to evenly lift scraper 103. As blade 104 approaches end 18a of partition 18, the cables 114 will move over roller 136b initiating lifting of end 103b of scraper 103 which will substantially stop motion of end 103b toward partition 18. As bridge 82 continues to move toward partition 18, cable 110 will move over roller 136a to initiate lifting of end 103a of scraper 103, causing the edge of scraper blade 104 to move upwardly on partition 18. As the lifting of scraper 103 occurs prior to contact with end 18a of partition 18, sludge is not trapped against partition 18.

Upon contact with limit switch 140, more fully described hereinafter, the drive motor 100 will reverse direction to move bridge 82 toward partition 16. As bridge 82 moves cables 110 and 114 it will lower scraper 103 and align the scraper 103 parallel to the lower end 18a of partition 18 with blade 104 contacting end 18a of partition to wipe sludge away from partition 18. Upon movement away from partition 18 the blade 104 will cause the sludge to move down the space between the spaced blades 104 and 106 toward sludge trough 76.

As bridge 82 continues travel toward partition 16, the edge of blade 106 will engage the sludge on the bottom 36a and lift the sludge onto the surface 106a, sliding the sludge into sludge trough 76. As bridge 82 nears partition 16, cable 116 will engage roller 136c after being drawn thereover by arm 130 and lift end 103b of scraper 103 to prevent entrapment of sludge adjacent the lower end 16a of partition 16. Bridge 82 continues movement toward partition 16 until cable 112 engages roller 136d and end 103a of scraper 103 is lifted off bottom 36a. Upon contact with limit switch 144 by bridge 82, motor 100 will reverse direction, again moving bridge 82 toward partition 18.

It should be readily apparent that the cables which suspend scraper 103 are slack on the side away from the direction of travel and that cables on the side toward the direction of travel are in tension.

Angularly spaced blades 104 and 106 are disposed at an angle $a$ from flange 108 so as to slide under the sludge on the bottom 36a. The angle $a$ should be such that flange 108 remains in a vertical plane relative to the bottom 36a and will not be tilted over in the direction of travel since the blades 104 and 106 should slide under the sludge and the weight of the sludge on the surface of the blade exerts a downward pressure necessary to keep flange 108 in a vertical position.

The scraper 103 has two blades, 104 and 106. The blade opposite the leading blade performs two functions, (1) to balance the scraper 103 because it has an equal weight to that of the leading blade, and (2) to scrape the sludge away from partition 16 or 18 upon being lowered to the floor 36a when a reversal of direction occurs.

Figure 9:
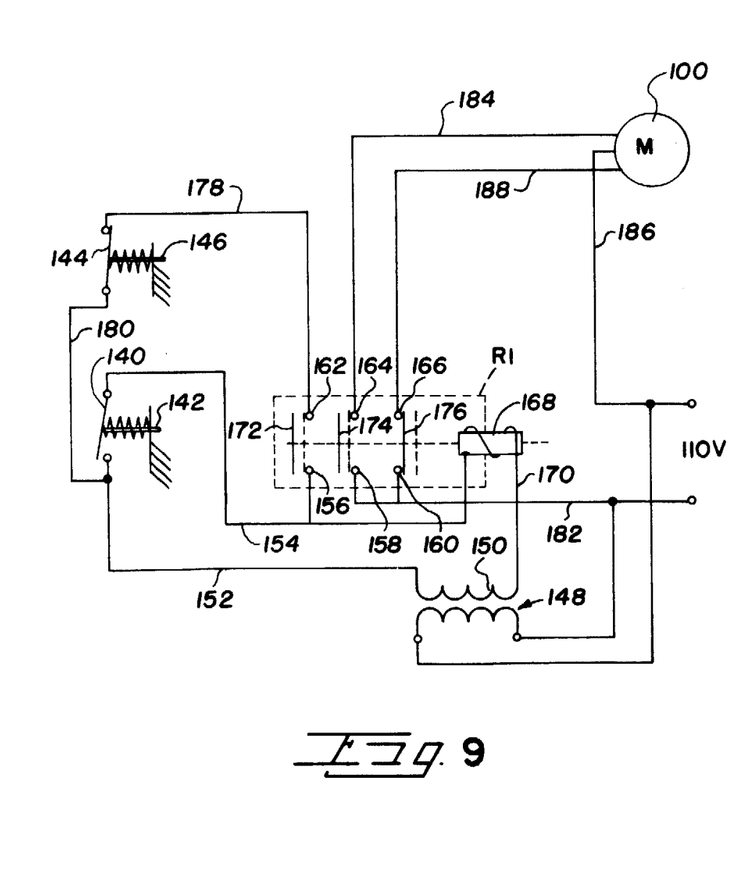
FIG. 9 is a diagrammatic view of the motor actuating means.

Actuating means comprising a normally opened spring-biased switch 140 is secured on partition 16 such that bridge 82 trips plunger 142 to close switch 140, and a normally closed switch 144 mounted on partition 18 such that bridge 82 trips plunger 146 to open switch 144. To prevent accidental electric shock a low voltage system is illustrated in the preferred embodiment (but other systems may be employed) wherein transformer 148 is connected to a voltage supply, such as 110 volts AC, and has a secondary coil 150, one side of which is connected to lead 152 which is connected to one contact of normally opened switch 140. The other contact of normally opened switch 140 is connected to lead 154 which is secured to contact 156 of relay R1 and one side of relay solenoid 168. Lead 170 connects the other side of the relay solenoid 168 to the other side of secondary coil 150 of transformer 148.

When bridge 82 is adjacent wall 16, tripping plunger 142 and closing normally opened switch 140 energizes relay solenoid 168. Contacts 156 and 162 are thus closed by blade 172 of relay R1 forming a holding circuit through lead 178 secured to contact 162 and one side of normally closed switch 144, through the other side of normally closed switch 144 through lead 180 to lead 152. A circuit is made from lead 182 through contact 158 and 164 through blade 174 to lead 184 which is secured to motor 100 to drive the motor in the direction toward partition 18. Motor 100 has a common ground lead 186 secured to a suitable source of current such as 110 volts. When solenoid 168 is energized, the normally closed contacts 160 and 166 are opened.

When bridge 82 reaches partition 18, plunger 146 is tripped opening normally closed switch 144 which breaks the holding circuit formed through leads 178 and 180 thus de-energizing the solenoid 168. Contacts 158 and 164 are thus opened and motor 100 de-energized in the direction of partition 18. Blade 176 returns to its normal position across contacts 160 and 166 completing a circuit through lead 188 connected through contact 166 to motor 100 which energizes the motor 100 in a direction to move bridge 82 toward partition 16.

The speed of motor 100 determines the speed of scraper 103 which is dependent upon the geometric configuration of the tank 10 and the buildup of sludge on bottom 36a. It should be readily apparent that means to control drive motor 100 may be provided such as a timing clock or other such device.

Means to return the sludge to aeration zone 26 comprises an air-lift pump 78 rigidly secured to bridge 82 adjacent wall 14 and over sludge trough 76 such that the pump 78 moves with bridge 82 (FIG. 4). The pump 78 comprises a hollow conduit having a lower end 78a submerged in sludge trough 76 and an upper end 78b arranged to discharge the sludge into the collection trough 77. Air is supplied from air conduit 99 by pipe 79 to air being discharge into the lower end 78a of pump 78. The air moves up the pump 78, drawing sludge and a portion of the water within sludge trough 76 up the pump 78 and discharging it into trough 77. As the bridge 72 moves back and forth the air-lift pump 78 moves with it cleaning the sludge trough 76 as the sludge is delivered from scraper 103.

Figure 2:
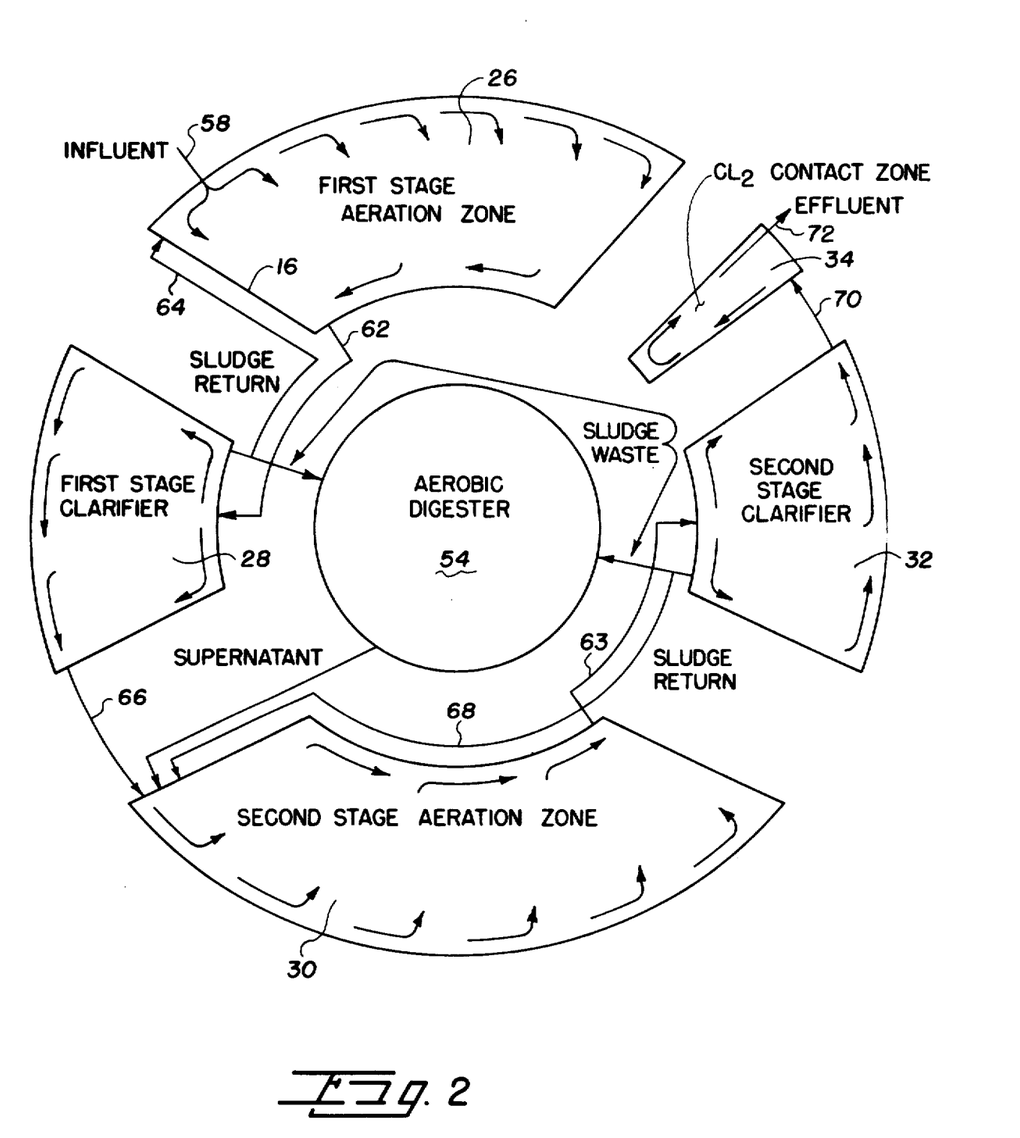
FIG. 2 is a diagrammatic view of the flow of liquid through a biological waste treatment plant.

The flow of the liquor (liquid sewage) is best illustrated by FIGS. 1 and 2 of the drawings. Influent is introduced through inlet conduit 58 which communicates with distribution trough 38. The distribution trough 38 evenly distributes the influent through slide gates 42 into the first aeration zone 26. The waste water is mixed with microorganisms (present in the tank and from returned sludge). Diffusers 60 in the first aeration zone 26 provide oxygen to the microorganisms to sustain their life.

The combined sludge and water (mixed liquor) flows into the collection trough 50 of the first aeration zone 26 and flows through conduit 62 into the first clarifier 28. In clarifier 28 the mixed liquor is allowed to settle, separating the sludge from the liquid for return to the first aeration zone 26 by means of conduit 64.

Sludge is separated from the water by gravity in clarifier 26. The clear water flows over baffle 48 (FIGS. 1 and 4) into effluent trough 44, through conduit 66, into distribution trough 40, and out slide gates 42 into aeration zone 30. The mixed liquor is further aerated by diffusers 60 which supply oxygen to the microorganisms to further their growth.

The mixed liquor then flows into the collection trough 52, through conduit 63, and into the second clarifier 32. Again the remaining sludge settles from the mixed liquor by gravity to the bottom 36a of the second clarifier tank 32. Sludge is directed back into the second aeration zone 30 through a conduit 68 and water is collected in the effluent through 46. Effluent from trough 46 flows into chlorine contact zone 34 through conduit 70. Water within contact zone 34 is permiated by the chlorine metered into the chlorine contact zone 34 to disinfect the water prior to discharge through effluent connection 72.

Operation of the heretofore described device is as follows:

As illustrated in FIG. 7 of the drawings, bridge 82 is adjacent to partition 16 with scraper 103 in the raised position. Normally opened switch 140 is closed thus energizing solenoid 168 to energize motor 100 which moves bridge 82 in a direction toward partition 18.

As bridge 82 moves, cables 112 and 116 lowers scraper 103 to the lower end 16a of partition 16. As bridge 82 continues movement the leading edge of blade 104 engages sludge on the bottom 36a, lifting the sludge onto the surface of blade 104. The weight of the sludge on the upper surface of blade 104 urges scraper 103 downwardly into wiping relation with bottom 36a.

The scraper 103 continues to move with bridge 82, being drawn by cables 110 and 114 across bottom 36a. As the sludge is lifted off of the bottom 36a it slides down the surface of blade 104 into trough 76 due to the incline in the floor 36a and the blade surface.

The sludge from sludge trough 76 is lifted by air-lift pump 78 from trough 76 and deposited in aeration tank 26, or a certain portion may be wasted into an aerobic digester 54.

Upon nearing partition 18, support arm 128 moves over roller 136b, drawing cable 114 thereover and lifting end 103b of scraper 103. End 103a of scraper 103 continues to move in contact with bottom 36a and is then pivotted about end 103b until arm 124 draws cable 110 over roller 136a, thus lifting the scraper 103 upwardly along partition 18. Movement of bridge 82 continues until plunger 146 of normally closed switch 144 is tripped thus breaking the holding circuit to de-energize relay 168. Upon de-energizing solenoid 168, contacts 160 and 166 are closed and motor 100 reverses direction moving bridge 82 toward partition 16.

Scraper 103 is lowered to bottom 36a until the edge of blade 104 is substantially aligned in contact with end 18a of partition 18. Motion of bridge 82 continues toward partition 16, drawing tension on cables 112 and 116 which causes the edge of blade 106 to engage the sludge on bottom 36a and lifts the sludge into the surface of blade 106 so as to urge scraper 103 downwardly. The back edge of blade 104 will engage any sludge located adjacent partition 18. Movement of the scraper 103 toward partition 16 will scrape the sludge next to partition 18 outwardly causing same to travel down the space between blades 104 and 106 of scraper 103 toward end 103b into sludge trough 76.

The scraper mechanism may be programmed to continuously cycle or programmed on a timed basis to cycle once every hour, once every day and so forth.

Although the preferred embodiment illustrated is a circular treatment plant, it should be readily apparent that the scraper mechanism may be adapted to a rectangular tank wherein the bridge would still travel between the ends of the clarifier and operate substantially the same.

The particular geometry of the tank will determine the relative lengths of the cables 110–116 and the arms 124–130 depending upon the particular needs of the treatment plant being used. It is not intended to limit my invention to use in circular treatment plants.

From the foregoing it should be readily apparent that the embodiment hereinbefore described accomplishes the objects of the invention hereinbefore discussed.

It should be appreciated that other and further embodiments of the invention may be devised without departing from the basic concept thereof.

Having described my invention, I claim:

1. In a clarifier to remove sludge from liquid influent: a tank having first and second end walls secured between sidewalls and a bottom; a bridge; means moveably securing said bridge over said tank; drive means to move said bridge from a position adjacent a first end wall of said tank to a position adjacent the second end wall of said tank; support arms; means securing said support arms to said bridge such that they extend above the first and second ends of said tank; a sludge trough positioned between the first and second end walls of said tank and extending along one of said sidewalls; scraper means moveable along the bottom of the tank to move sludge into said sludge trough; flexible suspension means securing said scraper means to the ends of said support arms adapted to move the scraper means between the first and second end walls of said tank as the bridge moves between the first and second end walls, said flexible suspension means being arranged to engage and be drawn over the end walls to lift said scraper means off the bottom as said support means move over said first and second ends of said tank.

2. The combination called for in claim 1 wherein the scraper means comprises: a pair of angularly spaced blades; a flange extending outwardly of the joinder between said blades; and means connecting said flexible suspension means to said flange.

3. The combination called for in claim 1 wherein the flexible suspension means comprises: cables; means securing a first end of said cables to said support arms; and a means securing a second end of said cables to said scraper means.

4. The combination called for in claim 1 wherein the means moveably securing said bridge over said tank comprises: guide tracks secured to the upper end of said tank between the first and second end walls of said tank; and wheels rotatably secured to said bridge and moveably engageable with said guide track.

5. The combination called for in claim 4 wherein the drive means comprises: a motor; and a means to connect said motor to said wheels.

6. The combination called for in claim 5 with the addition of actuating means to energize said motor in a first direction to move said bridge toward said first end of said tank and actuating means to energize said motor in a second direction to move said bridge toward said second end of said tank.

7. A sludge settling tank comprising: first and second spaced walls; a first partition transversely secured between said first and second walls; a second partition transversely secured between said first and second walls and spaced from said first partition; a bottom in said tank; a bridge; means moveably securing said bridge over said first and second walls; drive means to move said bridge from a position adjacent said first partition to a position adjacent said second partition; support arms; means to secure said support arms to said bridge in a position to extend above said first and second partitions as the bridge approaches the first and second partitions; a sludge trough positioned adjacent said second wall between said first and second partitions; a scraper blade transversely positioned between said first and second walls such that as the scraper blade moves between the first and second partitions the scraper blade lifts the sludge off the bottom causing the sludge to slide along the scraper and bottom toward the sludge trough; flexible suspension means having a first end secured to said scraper blade and a second end secured to said support arms and adapted to cause said scraper blade to move between said first and second partition with said bridge to lift said scraper blade from said bottom when said suspension means is drawn over the tops of the partitions; and guide means on said first and second partitions to guide said flexible suspension means over said partitions.

8. The combination called for in claim 7 with the addition of guide means; and means to secure said guide means on said first and second partitions to guide said flexible suspension means over said partitions.

9. The combination called for in claim 7 with the addition of means to remove the sludge from said sludge trough.

10. The combination called for in claim 7 wherein the means moveably securing said bridge over said first and second walls comprises: guide tracks; means securing said guide tracks to the upper edges of said first and second walls; wheels; and means rotatably securing said wheels to said bridge in a position to engage said guide tracks.

11. The combination called for in claim 7 wherein the scraper blades comprises: a connecting flange; and a pair of blades angularly disposed from the connecting flange.

12. The combination called for in claim 7 wherein the support arms are secured to the bridge perpendicular to the longitudinal axis of the bridge between the first and second walls and in a plane parallel to the bridge and upper edges of the walls above the level of the first and second partitions.

13. The combination called for in claim 7 wherein the bottom of the tank is inclined toward the sludge trough.

14. In a clarifier to remove a sludge from liquid influent: a tank having first and second end walls secured between sidewalls and a bottom; a bridge; means moveably securing said bridge over said tank; drive means to move said bridge from a position adjacent a first end wall of said tank to a position adjacent the second end wall of said tank; support arms; means securing said support arms to said bridge such that they extend above the first and second end walls of said tank; a sludge trough positioned between the first and second end walls of said tank and extending adjacent one of said sidewalls; scraper means moveable along the bottom of the tank to move sludge into said sludge trough; flexible suspension means securing said scraper means to the ends of said support arms adapted to move the scraper means between the first and second end walls of said tank as the bridge moves between the first and second end walls, said flexible suspension means being arranged to engage and be drawn over the end walls to lift said scraper means off the bottom as said support arms move over said first and second ends of said tank; and guide roller means positioned on the first and second end walls of said tank adapted to guide said flexible suspension means over said end walls.

15. In a sludge settling tank having first and second end walls secured between side walls and a bottom, a sludge scraper comprising: scraper means moveable along the bottom of said tank; support means moveably secured over said tank adapted to move between said first and second end walls; a pair of support arms; means securing said support arms to said support means and flexible suspension means securing said scraper means to said support arms such that as an end of each of said support arms moves past one of the end walls the flexible suspension means is drawn over the end wall thereby lifting the scraper means off of the bottom and then to lower the scraper means to the bottom as the support means reverses direction.

16. The combination called for in claim 15 wherein the support means comprises: a bridge; means moveably securing the bridge over the tank; and drive means to alternately move said bridge from a position adjacent the first end wall to a position adjacent the second end wall.

17. The combination called for in claim 15 wherein the scraper means comprises: a pair of angularly spaced blades; and means for securing said blades adjacent their connection to the suspension means.

18. The combination called for in claim 15 with the addition of: guide means secured adjacent to and above said end walls to guide said suspension means over said walls.

19. In a sludge settling tank having first and second end walls secured between side walls and a bottom, said bottom being sloped from the outer side wall to the inner side wall; a sludge scraper comprising: scraper means moveable along the bottom of said tank; support means moveably secured over said tank adapted to move between said first and second end walls; a trough formed along the inner side wall, and flexible suspension means securing said scraper means to said support means such that as the support means moves past one of the end walls the flexible suspension means is drawn over the end wall thereby lifting the scraper means off of the bottom and then to lower the scraper means to the bottom as the support means reverses direction, the suspension means adjacent the inner side wall being longer than the suspension means adjacent the outer sidewall.

* * * * *